(No Model.)

U. & H. E. EBERHARDT.
AUTOMATIC MACHINE FOR CUTTING RACK TEETH.

No. 400,645. Patented Apr. 2, 1889.

5 Sheets—Sheet 1.

Attest:
L. Lee.
F. C. Fischer.

Inventors:
U. Eberhardt
and H. E. Eberhardt,
per Crane & Miller, Attys.

(No Model.) 5 Sheets—Sheet 2.

U. & H. E. EBERHARDT.
AUTOMATIC MACHINE FOR CUTTING RACK TEETH.

No. 400,645. Patented Apr. 2, 1889.

Attest:
L. Lee.
F. C. Fischer.

Inventors:
W. Eberhardt
and H. E. Eberhardt,
per Crane & Miller, Attys.

(No Model.) 5 Sheets—Sheet 3.

U. & H. E. EBERHARDT.
AUTOMATIC MACHINE FOR CUTTING RACK TEETH.

No. 400,645. Patented Apr. 2, 1889.

Attest:
L. Lee.
F. C. Fischer.

Inventors:
U. Eberhardt
H. E. Eberhardt,
per Crane & Miller, Attys.

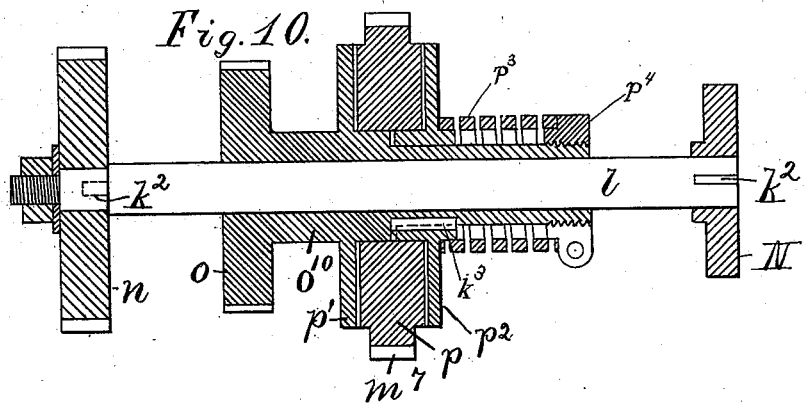
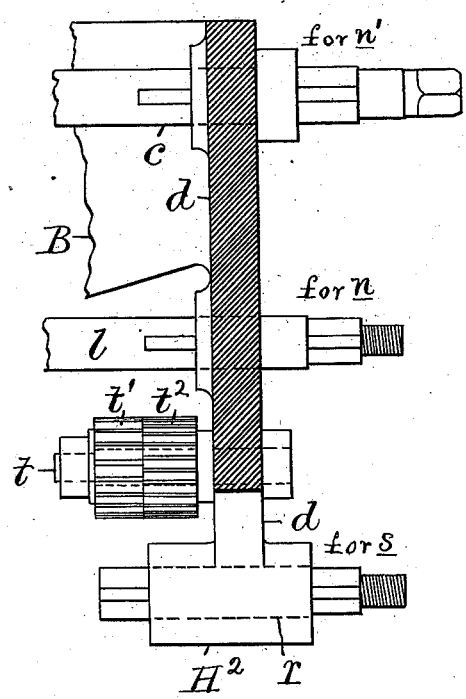
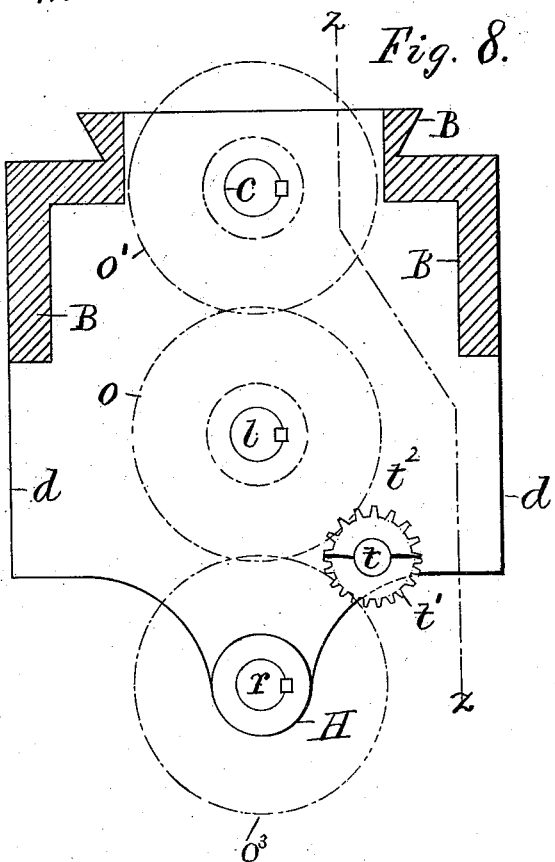

(No Model.) 5 Sheets—Sheet 5.
U. & H. E. EBERHARDT.
AUTOMATIC MACHINE FOR CUTTING RACK TEETH.
No. 400,645. Patented Apr. 2, 1889.
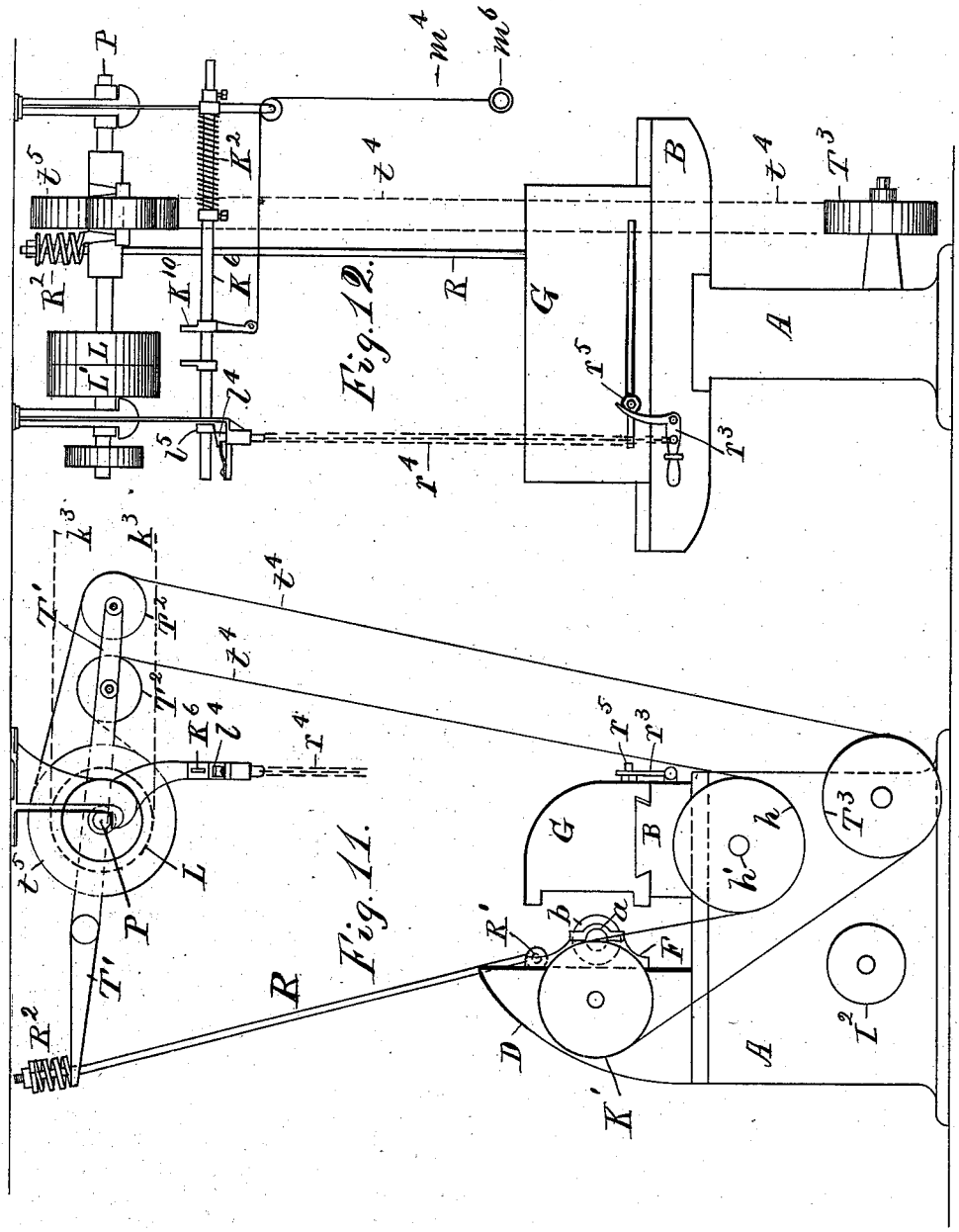
Attest:
L. Lee,
F. C. Fischer.
Inventors:
U. Eberhardt
and H. E. Eberhardt,
per Crane & Miller, Attys.

UNITED STATES PATENT OFFICE.

ULRICH EBERHARDT AND HENRY E. EBERHARDT, OF NEWARK, NEW JERSEY.

AUTOMATIC MACHINE FOR CUTTING RACK-TEETH.

SPECIFICATION forming part of Letters Patent No. 400,645, dated April 2, 1889.

Application filed November 3, 1888. Serial No. 289,887. (No model.)

*To all whom it may concern:*

Be it known that we, ULRICH EBERHARDT and HENRY E. EBERHARDT, citizens of the United States, residing at Newark, Essex county, New Jersey, have invented certain new and useful Improvements in Automatic Rack-Cutters, fully described and represented in the following specification and the accompanying drawings, forming a part of the same.

The object of this invention is to furnish an automatic machine for cutting by means of rotary cutters a series of teeth upon a metallic rack, the machine being so constructed as to cut two or more teeth at the same time, and to automatically reverse the movement of the cutter-head to take a fresh cut, and to shift the rack longitudinally to expose a fresh section of its surface to the action of the cutters.

The invention also includes means for feeding the rack-carriage to cut teeth of either diametral or circumferential pitch and other details of construction, including the arrangement of the frame and the cutter-head in relation to the rack-carriage.

Figure 1:
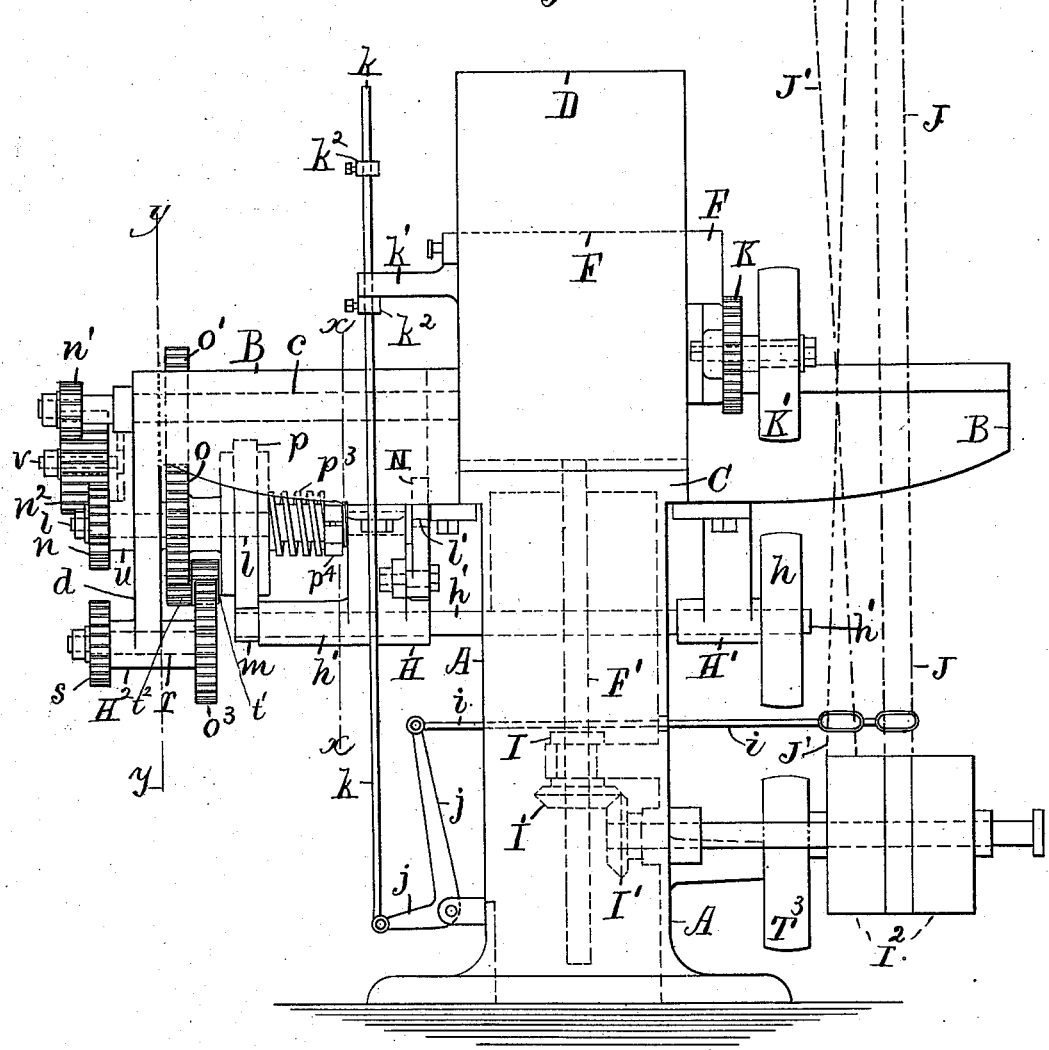
Figure 2:
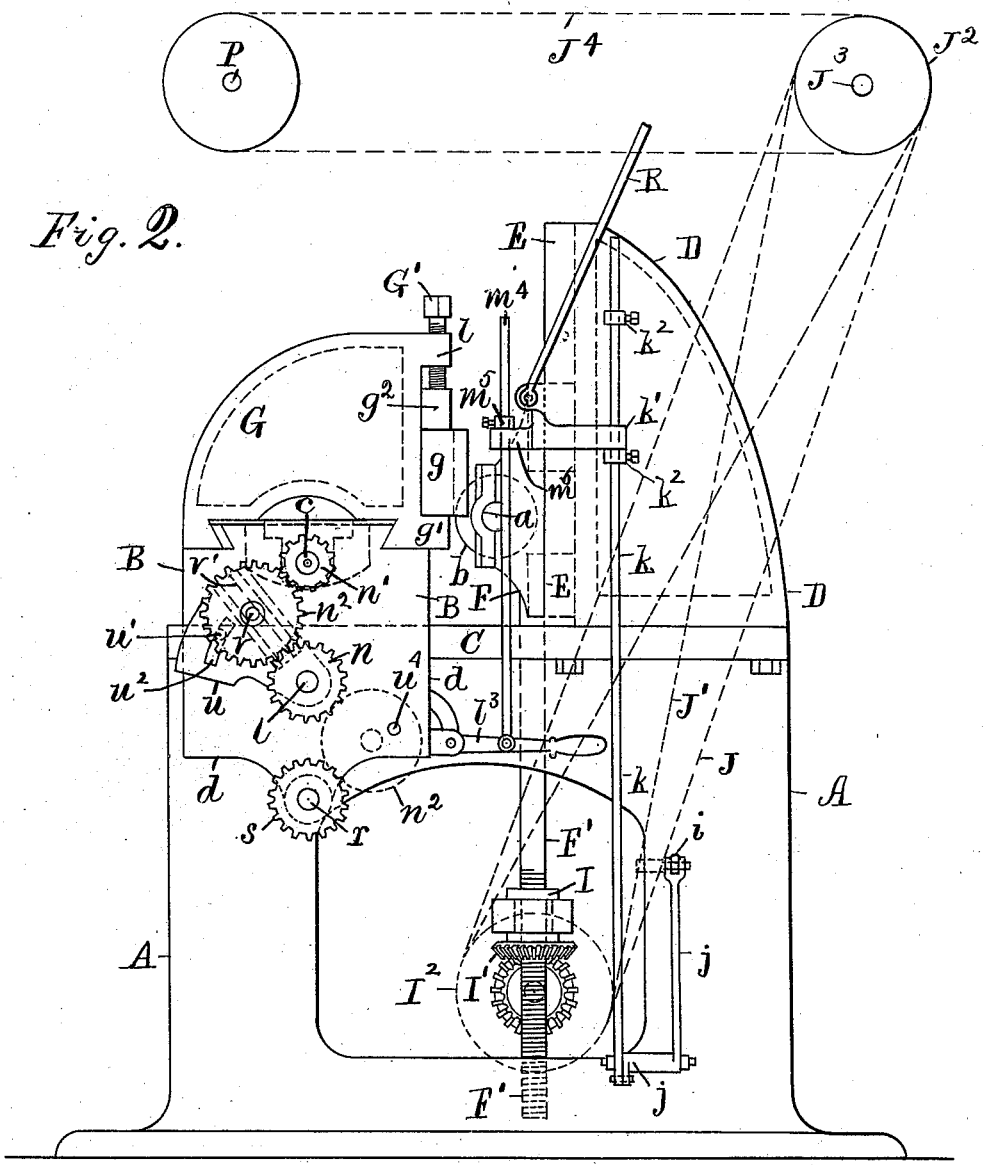
Figure 3:
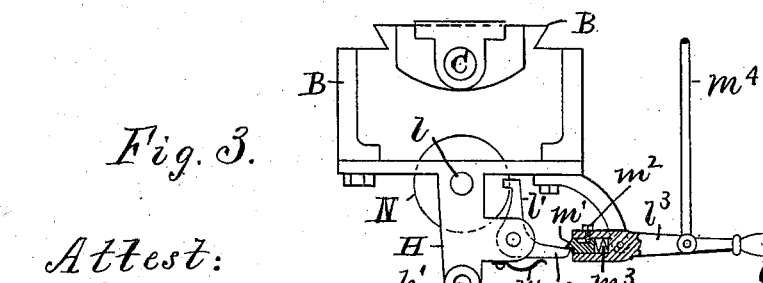
Figure 4:
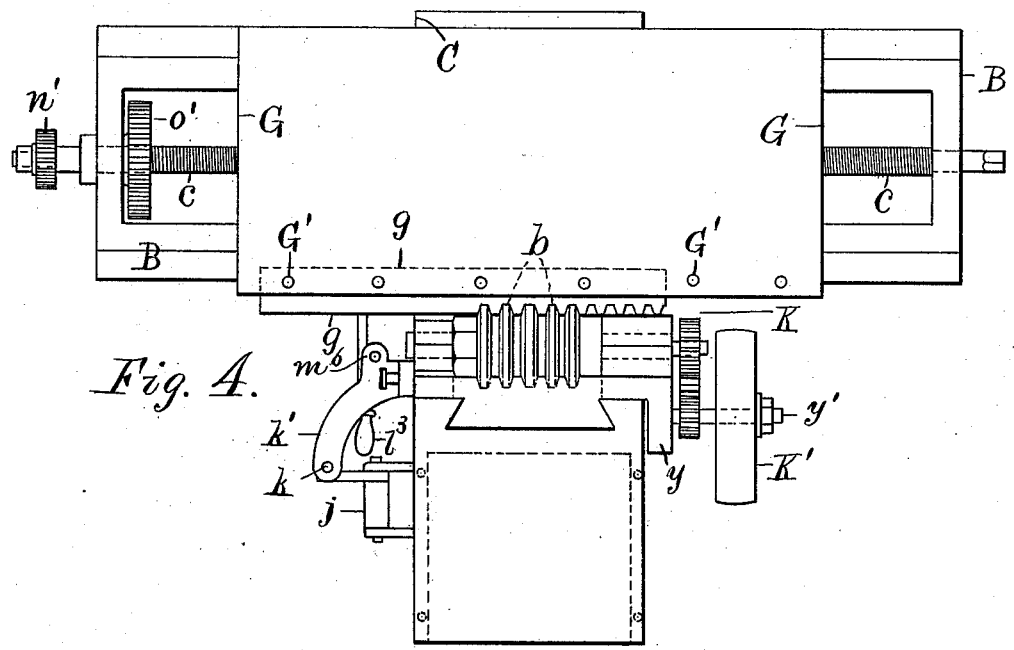
Figure 5:
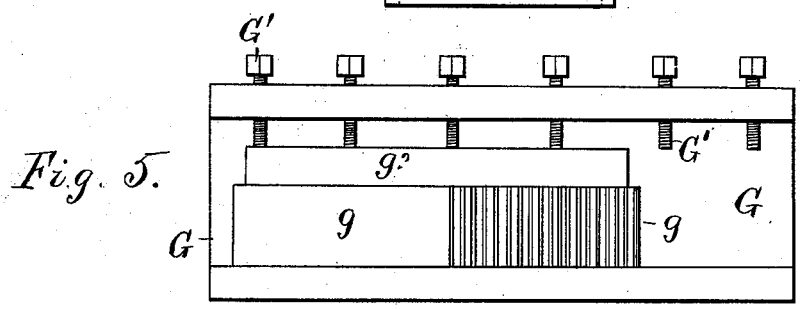
Figure 6:
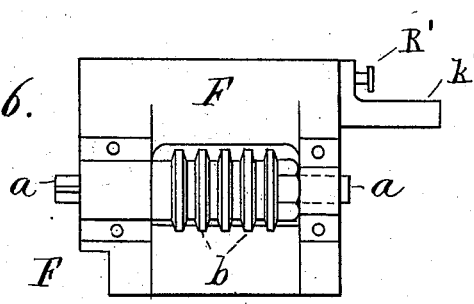
Figure 7:
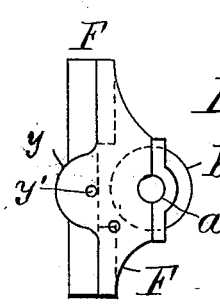

In the drawings, Figure 1 is a front elevation of the machine. Fig. 2 is a side elevation taken at the left-hand end of Fig. 1. Fig. 3 is a section of the cross-head on line $x\,x$ in Fig. 1. Fig. 4 is a plan of the machine; Fig. 5, an elevation of the face of the rack-carriage; Fig. 6, a view of the inner face of the cutter-head, and Fig. 7 a view of the cutter-head upon the opposite side from that shown in Fig. 2. Fig. 8 is a section of the cross-head, looking outward on line $y\,y$ in Fig. 1. Fig. 9 is a vertical section of the cross-head on line $z\,z$ in Fig. 8. Fig. 10 is a longitudinal section of the friction-wheel spindle detached from its bearing. Fig. 11 is an elevation of the machine upon the side opposite that shown in Fig. 2, with the counter-shaft and belts for driving the same; and Fig. 12, a rear elevation of the parts shown in Fig. 11.

In the design shown herein a longitudinal bed, A, is provided with a transverse cross-head, B, fixed adjustably at one end of ways C, formed upon the top of the bed.

A stanchion, D, formed with vertical guides E, is fixed upon the opposite end of the ways, and a cutter-head, F, is fitted to slide vertically in such guides, and is provided with a horizontal spindle, $a$, carrying the cutters $b$. A rack-carriage, G, is fitted to the cross-head B to move parallel with the cutter-spindle $a$, and is moved upon the cross-head by a screw, $c$, rotated at intervals by suitable gearing.

The end of the cross-head is provided with a bracket, $d$, for carrying the gearing and change-wheels required to vary the movement of the screw $c$, and upon its under side, at the same end, is secured a bracket, H, having bearings for a pulley-shaft, $h'$, and friction-shaft $l$ to actuate such gearing. A pulley, $h$, is shown fixed at the opposite end of the pulley-shaft, and a bracket, H′, is shown secured to the under side of the cross-head near its opposite end to support the same shaft adjacent to the pulley. A screw, F′, is projected from the lower side of the cutter-head F and extended through a rotary nut, I, which is turned in opposite directions by gears I′ and pulleys I$^2$, provided with straight and crossed belts J J′.

A shipper-bar, $i$, is provided to shift the belts J J′, and is connected with the cutter-head F by a bell-crank, $j$, and a rod, $k$, which rod is extended through a lug, $k'$, upon the cutter-head and provided with adjustable collars $k^2$, to be actuated by the cutter-head at the opposite ends of its stroke, and to thus shift the belts upon the pulleys I$^2$ and reverse the movement of the cutter-head after cutting each tooth.

The cutter-head is provided with gears K and pulley K′ to rotate the cutter-spindle, and a part of our invention consists in mounting a series of identical cutters, $b$, side by side upon the spindle to form a number of teeth in the blank $g$, which is shown clamped by screws G′ in the rack-carriage G.

The screws project downward from lugs $l$ along the upper edge of the carriage, and the carriage is provided with a horizontal strip, $g'$, at its lower edge opposite the cutter-head to sustain the blank $g$ from which the rack would be cut.

Packing-blocks $g^2$ would be employed, as in similar constructions, to hold the blank in the proper position under the pressure of the screws G′. The construction of the cutter-head with a vertical movement and the arrangement of the rack-carriage to present the surface of the rack in which the teeth are to be formed in a vertical position to the cutters secures the immediate discharge of the chips from the rack and from the cutters, and greatly facilitates the operation of the cutters and the lubrication of the same if oil or water is required.

The means shown for rotating the feed-screw $c$ is identical with that claimed in the Patent No. 332,064, dated December 8, 1885, and consists in a shaft driven by a belt and connected with the screw by change-wheels through the intervention of a frictional driver and a locking device which is released at intervals by the movement of the cutter-head; but a modification of such invention is shown in our present construction for cutting rack-teeth of either diametral or circumferential pitch, for which purpose two trains of gearing are provided between the locking mechanism and the screw $c$.

The locking mechanism is shown in detail in Fig. 3, and consists in a disk, N, affixed upon a shaft, $l$, having a friction-driver applied thereto and actuated by a pinion, $m$, upon the end of the pulley-shaft $h'$. A gear-wheel, $n$, is shown fixed rigidly upon the shaft $l$ (like the disk N) by key $k^2$ for operating the two trains of feed-gearing. A catch, $l'$, is shown held to a notch in the disk by spring $w$, and provided with a lever-arm, $l^2$, extending in the path of a catch which is shifted or oscillated by the cutter-head at the upper end of its stroke. The catch consists in a tooth, $m'$, held in a socket in the end of a vibrating arm, $l^3$, by a screw, $m^2$, and pressed outward to engage with the arm $l^2$ by a spring, $m^3$.

A rod, $m^4$, is attached to the vibrating arm and provided with a collar, $m^5$, which is raised by a lug, $m^6$, upon the cutter-head when at the top of its stroke. The movement of the arm effected by such collar depresses the lever-arm $l^2$, affixed to the catch $l'$, and releases the disk, so that it can rotate under the influence of the friction-driver. This driver consists in a smooth circular plate, $p$, with teeth $m^7$ upon its periphery to mesh with the pinion $m$, and is shown fitted to a sleeve, $o^{10}$, provided with a gear-wheel, $o$, and arranged to turn loosely upon the shaft $l$ between its bearings in the brackets H and $d$. The friction-plate is clamped between a flange, $p'$, fast on the sleeve $o^{10}$, and a loose flange, $p^2$, pressed toward the plate by a spring, $p^3$, and clamp-nut $p^4$. The flange $p^2$ is caused to rotate with the sleeve by a key, $k^3$. The plate $p$ is rotated continuously when the machine is in operation, and the spring is so adjusted that the plate may slip between the flanges when the wheel $o$ is held from turning; but may produce sufficient friction when the wheel is released to rotate the screw $c$ in the desired manner. The friction-driver and the wheel $o$ produce no movement in the shaft $l$, but are geared directly to the feed-screw $c$ by a wheel, $o'$, secured upon the latter; and two trains of gearing are provided to connect the screw with the shaft $l$ and its locking-disk, so that the screw may be turned in the desired manner to cut teeth of either diametral or circumferential pitch. A bearing, $H^2$, is affixed to the bracket below the shaft $l$, and a shaft, $r$, is fitted therein and provided at its outer end with a neck for change-wheels $s$ and at its inner end with a wheel, $o^3$, having seventy-seven teeth. A neck is provided upon the end of the screw $c$ to receive change-wheels $n'$. The screw is cut with a pitch of .5236 of an inch, corresponding with the circumference of a circle having a diameter one-sixth of an inch, and a single rotation of the screw being thus adapted to shift the carriage for a wheel-pitch of six teeth to one inch of diameter.

To secure a single rotation of the screw for a single rotation of the frictional driver, it would only be necessary to connect the locking-disk N with the screw by using a wheel, $n'$, of the same size as the wheel $n$, and connecting them together by a suitable intermediate gear, $n^2$. (Shown in Figs. 1 and 2.) The intermediate gear, $n^2$, is shown mounted upon a stud, $v$, fitted in a slot, $v'$, in a so-called "frog" or "movable plate," $u$. A bolt, $u'$, is inserted through a slot, $u^2$, in the plate and tapped into the bracket $d$ to secure the plate in the desired position. The intermediate gear could thus be applied to change-wheels $n$ and $n'$ of any desired size. The friction-driver would therefore operate when the catch $l'$ was retracted to rotate the screw (through the gears $o$ and $o'$) until the catch again engaged the notch in the disk. The spring $w$ would operate the catch $l'$ to always arrest the disk at the close of one revolution and the screw would be rotated through any desired arc in a complete rotation of the disk by employing change-wheels $n$ and $n'$ of any desired dimensions, as in screw-cutting lathes.

In the drawings, Figs. 1 and 2, the wheel $n$ is shown with eighteen teeth and the wheel $n'$ with twelve and adapted to turn the screw one and a half revolution for each turn of the disk for cutting teeth of four to one inch diametral pitch.

It will be noticed that the proportions of the wheels $o$ and $o'$ are immaterial, as they operate simply to connect the screw with the friction-driver, and the friction-driver might be located at any other point in the apparatus than upon the shaft $l$, carrying the disk N, to which it is applied merely for compactness of construction. To cut in the rack-blank teeth at a circumferential pitch or spaced in inches, and even fractions of an inch, a train of gearing is provided, which rotates the wheel $s$ $\frac{5000}{5236}$ of a revolution, such gearing being shown upon the inner side of the bracket in Fig. 1 and in the enlarged view in Figs. 8 and 9. A stud, $t$, is fixed upon the inner side of the bracket $d$ and carries two pinions, $t'$ and $t^2$, connected rigidly together, the former having twenty-five teeth and meshing into the wheel $o^3$ with seventy-seven teeth, and the pinion $t^2$ having seventeen teeth meshing into the wheel $o$, which is formed with fifty teeth. The wheels with fifty and twenty-five teeth are the drivers in the train, and those with seventy-seven and seventeen teeth are the driven wheels. The product of the drivers (1,250) bears the same ratio to the product of the driven wheels (1,309) as the pitch of a half-inch screw bears to the diametral pitch, (.5236.) The wheels $o$ and $o^3$ when operating together in the train of gearing just described would be connected with the disk N by change-wheels $n$ and $s$ and a suitable intermediate, as hereinafter described. The wheels $o$, $o'$, and $o^3$ are indicated merely by dotted circles in Fig. 8, and one-half of each of the pinions $t'$ and $t^2$ is shown upon the studs $t$, to indicate their relation to the wheels $o$ and $o^3$.

In Fig. 9 the three large wheels are omitted; but the necks are shown upon the shafts $r$ and $l$ and the screw $c$, to which such gears would be applied, as well as the necks for the change-wheels $n$, $n'$, and $s$. By such proportions of teeth the rotations of the wheels $o$ and $o^3$ vary in the desired ratio, .5000 to .5236, and as the wheel $o^3$ is connected with the wheel $o'$ by the intermediate wheels, $t'$ and $t^2$, it is obvious that the rotations of the screw and of the wheel $o^3$ vary also in the desired ratio, $o$ and $o'$ being equal. To rotate the screw, therefore, in cutting circumferential pitches the disk N is connected with the wheel $s$ instead of with the wheel $n'$, the frog $u$ being in such case shifted to bring the intermediate gear, $n^2$, in contact with the wheels $n$ and $s$. To hold the plate $u$ in such a position, a hole, $u^4$, is formed in the bracket to receive the bolt $u'$, and the position of the intermediate gear with such arrangement of parts is shown by the dotted circle $h^2$ in Fig. 2.

In Figs. 1 and 2 the wheels $n$ and $s$ are shown of the same size, with eighteen teeth, and the wheel $s$ would thus rotate once for each turn of the disk; but the screw, being connected with the wheel $s$ through the wheels $o$ $o^3$ and pinions $t'$ $t^2$, would rotate but $\frac{5000}{5236}$ of a revolution for each complete turn of the disk, and would feed the carriage exactly .5 of an inch, (one-half inch.) Change-wheels substituted for the wheels $n$ and $s$ could then be used in cutting pitches of inches and even fractions of an inch, as desired.

It is obvious that if the thread of the screw were formed with .5 of an inch pitch it might be rotated $\frac{5000}{5236}$ of a revolution by connecting it with the wheel $s$ by a suitable train of gearing, and the change-wheels $n$ and $s$ could then be used to cut diametral pitch and the wheels $n$ $n'$ in cutting circumferential pitch.

The means for regulating the rotations of a feed-screw by connection with a notched disk is fully set forth in the Patent No. 332,064, dated December 8, 1885, and in practice the cutter-head F in our improved rack-cutter would be reciprocated by the means shown in the said patent instead of by the straight and crossed belts shown herein. The pulleys are shown instead of the clutch mechanism claimed in the said patent, as they require less illustration in the drawing. The means for reciprocating the cutter-head forms, however, no part of the present invention.

The pitch of the screw referred to herein is described as .5236 of an inch, and is formed by cutting such screw in a lathe having a leading-screw cut with pitch of .5 of an inch, and employing change-wheels similar to the wheels $o$ $o^3$ $t'$ $t^2$ intermediate to the lathe-spindle and such leading-screw. Such pitch, .5236 of an inch, is not precisely the same as the theoretical circumference upon a wheel corresponding to one sixth of an inch in the diameter of such wheel; but the variation between the theoretical pitch and that formed upon the screw would in cutting-racks produce an error of only $\frac{1}{1000}$ of an inch in a rack twenty feet long, and may therefore be wholly disregarded. The theoretical pitch of the screw should be .523598, instead of .5236.

It is obvious that the locking device would operate the same in relation to the screw and to the two trains of gearing whether the disk N and its shaft $l$ be rotated by a friction-driver or turned by hand.

The cutter-head is shown provided with an ear, $y$, carrying a stud, $y'$, upon which is rotated the pulley K', receiving a belt from a counter-shaft, P, and connected with the cutter-spindle by gears K. To compensate for the movement of the cutter-head to and from the overhead counter-shaft, a lever, T', is pivoted upon the counter-shaft and provided with guide-pulleys $T^2$. Guide-pulleys $h$ and $T^3$ are also provided in a suitable position upon the rack-cutter, and an endless belt, $t^4$, is carried from a pulley, $t^5$, upon the counter-shaft over the pulleys $T^2$ and under the pulleys $h$ and $T^3$ to the pulley K', carried by the cutter-head. An arm of the lever, T', is projected from the counter-shaft upon the side opposite to that sustaining the pulleys $T^2$, and is connected at a suitable distance from the counter-shaft with a tie-rod, R, which is linked to the cutter-head by pivot R', and is attached to the lever T' by a spring-connection, $R^2$, which operates to exert a tension upon the belt $t^4$. The downward movement of the cutter-head, which, with the construction shown, would otherwise slack the belt $t^4$, operates to move one arm of the lever T' downward and to raise the pulleys $T^2$ in such degree as to exactly compensate for the downward movement of the pulley K'. The motion of the cutter-head up and down would be automatically regulated by the shifting of the belts J J', or by any other suitable means, as that described in our patent No. 332,064, dated December 8, 1885. The feeding of the rack-carriage intermittently is also automatically effected by the friction-driver upon the actuation of the latch $l'$ by the contact of the lug $m^6$ upon the cutter-head with the collar $m^5$, and the machine would thus operate continuously to cut a series of teeth in the blank until the limit of the rack-carriage travel would be reached. To check the operation of the machine at such point, and thus prevent injury to the feed-screw or its connecting mechanism, a shipper-bar, K⁶, is mounted adjacent to the counter-shaft and provided with guides K¹⁰ to direct a belt, k³, upon the fast or loose pulleys L L', fixed upon the counter-shaft to stop and start it. A spring, K², is applied to the shipper to shift the belt normally upon the loose pulley, and a spring-bolt, l⁴, pressed normally toward the shipper K⁶, is provided adjacent to a collar, l⁵, fastened upon the shipper and adapted, when engaged with the latch, to hold the belt-guides K¹⁰ opposite the fast pulley L. A cord, m⁴, is secured at one end to the shipper and provided at the opposite end with a handle, m⁶, within reach of the operator, and is carried over a pulley, m⁵, or otherwise arranged so that when pulled by the operator the spring will be compressed and the shipper locked in its operative position by the engagement of the collar l⁵ with the spring-bolt.

A trip-lever, r³, is pivoted upon the cross-head B and connected by a rod or chain, r⁴, with the spring-bolt, and a dog, r⁵, is fixed upon the rack-carriage and arranged to strike an arm of the trip-lever when the carriage has reached the end of its travel to retract the spring-bolt and permit the spring K² to throw the belt k³ upon the loose pulley L'. The movement of the entire machine is then stopped, and can be started again by pulling the cord m⁶ or otherwise moving the shipper to its latched position, with the belt k³ upon the fast pulley of the counter-shaft.

From the above description it will be seen that the entire construction constitutes an apparatus automatic in all its operations and adapted, when started, to feed the rack-carriage intermittently, and to propel the cutter through the blank intermittently, and to stop the machine when the limit of its movement is reached.

Our improvement in the cutters b consists in applying to the spindle a series of three or more similar cutters so shaped and spaced upon the shaft that the metal of the blank which remains between them when they are traversed across its face is adapted to form two or more teeth of uniform size and pitch.

We have operated our invention by using over twenty similar cutters at once, thus forming twenty teeth of uniform size and pitch at the same time, and thus converting the blank strip of metal into a rack with very great rapidity. With such construction and arrangement for the cutters it is obvious that the feeding mechanism must be adapted to shift the blank a distance corresponding to the number of teeth cut at one reciprocation of the cutter-head, and such mechanism is furnished in the intermediate gears provided in our construction, which, by means of the stud v upon the frog u, may be compounded, as is common in turning-lathes and milling-machines, to rotate the screw through any desired arc.

It is immaterial what arrangement be made for the studs and wheels of the intermediate gearing, as suitable arrangements are already well known in the art.

We are aware that it is common to clamp more than one milling-cutter upon a spindle to operate simultaneously; but we are not aware that a gang or series of similar cutters spaced to form a series of teeth of uniform pitch has ever been applied to the spindle of a rack-cutter and combined with mechanism to shift the rack-blank a distance corresponding to the total pitch of the teeth cut by the gang of cutters.

In practice no straight and crossed belts like those shown at J J' would be used, but the mechanism referred to herein as described in our patent, No. 332,064, dated December 8, 1885. We have, however, in Fig. 2 shown a pulley, J², upon a shaft, J³, for such purpose, the shaft J³ being rotated by a belt, J⁴, from the counter-shaft P. The pulley h serves as one of the guide-pulleys upon the bed A for the belt t⁴, and the feed-gearing is thus continuously rotated by the shaft h' while the counter-shaft is in motion.

It is obvious that the feed-screw would feed the rack-blank to cut rack-teeth of diametral pitch—that is, adapted to operate with spur-teeth of diametral pitch—if the thread upon the screw were made to correspond with any diametral pitch or any multiple, or any proportion thereof, as the train of gearing used to regulate the rotations of the screw would be adapted to rotate the screw in the desired manner to shift the rack-blank for cutting teeth of any other diametral pitch than that with which the screw corresponded.

Having thus set forth our invention, what we claim herein is—

1. In a rack-cutter, the combination, with a cutter-head movable vertically and having the cutters mounted upon a horizontal spindle, of a rack-carriage adjustable to and from the cutter-spindle and movable parallel therewith and adapted to hold the blank with its face vertically before the cutters, as and for the purpose set forth.

2. A rack-cutter comprising a bed having horizontal ways C, a cross-head movable horizontally thereon, vertical guides formed upon the bed, a cutter-head fitted to slide vertically in such guides and provided with a horizontal cutter-spindle, and a rack-carriage movable upon the cross-head parallel with the cutter-spindle and adjustable to and from the same, as and for the purpose set forth.

3. In a rack-cutter, the combination, with a cutter-spindle, of a rack-carriage, a feed-screw having a thread corresponding with the diametral pitch of a spur-wheel, as .5236 of an inch, a shaft, r, and a train of gears connected with the said screw and adapted to rotate the shaft $\frac{5000}{5236}$ of a revolution for each rotation of the screw, and a locking device to hold the said shaft when turned, as and for the purpose set forth.

4. In a rack-cutter, the combination, with a cutter-spindle, a rack-carriage, and a screw for feeding the same carriage parallel with the spindle, of the notched disk N, a catch for locking the same, a shaft rotating with such disk and provided with a gear-wheel, $n$, and two interchangeable trains of gearing connecting the screw with such gear-wheels, the wheels in one train being proportioned to turn the screw for cutting teeth of diametral pitch, and the wheels in the other train being proportioned to turn the screw for cutting teeth of circumferential pitch, substantially as herein set forth.

5. In a rack-cutter, the combination, with a cutter-spindle, of a rack-carriage, a feed-screw for shifting the same, a shaft provided with a locking device to hold the said shaft when turned a complete revolution, and two interchangeable trains of gears adapted for connecting the said shaft and screw, the wheels in one train being proportioned to turn the screw for cutting teeth of diametral pitch, and the wheels in the other train being proportioned to turn the screw for cutting teeth of circumferential pitch, substantially as herein set forth.

6. In a rack-cutter, the combination, with a rack-carriage and a feed-screw for operating the same, of a rotary spindle provided with a gang of three or more cutters shaped and spaced upon the spindle to form in the rack-blank simultaneously a series of two or more teeth of uniform size and pitch, and feeding mechanism adapted to shift the rack-carriage intermittently in correspondence with the total pitch of the teeth cut by the gang of cutters, substantially as herein set forth.

7. In a rack-cutter having the feed-screw actuated by a friction-driver, the combination, with the feed-screw, of a shaft connected thereto by a suitable gearing, a friction-plate clamped between fast and loose flanges rotated with such shaft, and a spring pressed upon the movable flange, as and for the purpose set forth.

8. In a rack-cutter, the combination, with a cutter-head moving vertically upon a suitable bed and a rack-carriage moving horizontally upon the same, of a counter-shaft arranged over the rack-cutter, a belt-compensating lever pivoted upon the counter-shaft and carrying two guide-pulleys, two guide-pulleys upon the rack-cutter, an endless belt applied to the pulley upon the counter-shaft and to a pulley upon the cutter-head and carried over the several guide-pulleys, as set forth, and a connection from the cutter-head to the lever to move the lever with the cutter-head, as and for the purpose set forth.

9. The combination, with a rack-cutter having a horizontally-moving rack-carriage and a cutter-spindle mounted in a cutter-head, of a counter-shaft arranged over the rack-cutter, a belt connecting a pulley upon the counter-shaft with a pulley upon the cutter-head, a driving-belt applied to fast and loose pulleys upon the counter-shaft to stop and start the same, a shipper applied to such driving-belt, a spring to throw the shipper to its inoperative position, a latch to hold the shipper in its operative position, and a trip-lever connected with the latch and actuated by the rack-carriage to withdraw the latch at the end of the carriage travel, and to thereby stop the machine automatically, as and for the purpose set forth.

In testimony whereof we have hereunto set our hands in the presence of the two subscribing witnesses.

ULRICH EBERHARDT.
HENRY E. EBERHARDT.

Witnesses:
  THOS. S. CRANE,
  F. L. EBERHARDT.